United States Patent
Shan et al.

(10) Patent No.: US 8,254,322 B2
(45) Date of Patent: Aug. 28, 2012

(54) METHOD AND APPARATUS FOR CHANNEL MANAGEMENT IN COGNITIVE RADIO SYSTEM SUPPORTING MULTIPLE CHANNELS

(75) Inventors: Cheng Shan, Suwon-si (KR); Do-Young Kim, Yongin-si (KR); Eun-Taek Lim, Suwon-si (KR); Jung-Soo Woo, Suwon-si (KR); Geun-Ho Lee, Suwon-si (KR); Sang-Bum Kim, Seoul (KR); Yong-Ho Park, Cheonan-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 700 days.

(21) Appl. No.: 12/388,203

(22) Filed: Feb. 18, 2009

(65) Prior Publication Data
US 2009/0207800 A1    Aug. 20, 2009

(30) Foreign Application Priority Data
Feb. 18, 2008 (KR) .................... 10-2008-0014358

(51) Int. Cl.
*H04W 4/00* (2009.01)

(52) U.S. Cl. .................... 370/329; 370/344; 455/509
(58) Field of Classification Search .................... None
See application file for complete search history.

(56) References Cited

U.S. PATENT DOCUMENTS

| | | | |
|---|---|---|---|
| 2007/0248173 A1* | 10/2007 | Hassan et al. ............... | 375/260 |
| 2007/0249341 A1* | 10/2007 | Chu et al. .................... | 455/434 |
| 2008/0171546 A1* | 7/2008 | Hyon et al. .................. | 455/434 |
| 2008/0317062 A1* | 12/2008 | Timmers et al. ............. | 370/462 |
| 2009/0067354 A1* | 3/2009 | Gao et al. .................... | 370/310 |
| 2009/0268619 A1* | 10/2009 | Dain et al. ................... | 370/252 |
| 2010/0271948 A1* | 10/2010 | Challapali et al. ........... | 370/235 |
| 2010/0304772 A1* | 12/2010 | Wang et al. .................. | 455/509 |

* cited by examiner

*Primary Examiner* — Min Jung
(74) *Attorney, Agent, or Firm* — Jefferson IP Law, LLP

(57) ABSTRACT

A method and apparatus for channel management in a Cognitive Radio (CR) system supporting multiple channels are provided. The method includes generating a candidate channel set from an available channel list, configuring a backup channel set by combining at least one candidate channel, and updating the backup channel set when a channel change event occurs. Accordingly, the multiple channels can be effectively used in CR communication.

18 Claims, 6 Drawing Sheets

METHOD AND APPARATUS FOR CHANNEL MANAGEMENT IN COGNITIVE RADIO SYSTEM SUPPORTING MULTIPLE CHANNELS

PRIORITY

This application claims the benefit under 35 U.S.C. §119 (a) of a Korean patent application filed in the Korean Intellectual Property Office on Feb. 18, 2008 and assigned Serial No. 10-2008-0014358, the entire disclosure of which is hereby incorporated by reference.

BACKGROUND OF THE INVENTION

1. Field of the Invention

The present invention relates to a Cognitive Radio (CR) system. More particularly, the present invention relates to a method and apparatus for channel management in a CR system supporting multiple channels.

2. Description of the Related Art

Today, with the development of mobile communication technologies, various types of mobile communication systems can coexist while using different frequencies. The various types of mobile communication systems are assigned with different frequency resources to avoid mutual interference. Since the different frequencies cannot be assigned to all mobile communication systems due to limited frequency resources, research for effectively using frequency bands is actively being conducted.

For example, a Cognitive Radio (CR) technique is used to provide a desired communication service by automatically searching for an unused frequency according to an area and a time while protecting an allowed neighboring mobile communication system. That is, the CR technique can determine and utilize a frequency bandwidth, an output power, a modulation scheme, etc., conforming to a current environment by searching for an idle spectrum which is scattered in various widths and in which an occupied time is continuously changed. Thus, efficiency of a limited resource (i.e., frequency) can be increased.

FIG. 1 is a diagram for explaining a concept of a CR communication system according to the prior art.

Referring to FIG. 1, a Tele-Vision (TV) repeater 100 broadcasts a video signal to TV receivers (not shown) located in a service area by using an assigned channel. A first CR system includes Base Stations (BSs) 121, 122, and 123 and provides services to Mobile Stations (MSs) (not shown) located in respective service areas by sharing a channel during a time when the TV repeater 100 does not broadcast through the channel. Likewise, a second CR system includes BSs 130 and 131 and provides services to MSs (not shown) located in respective service areas by sharing a channel during a time when the TV repeater 100 does not broadcast through the channel. The first CR system and the second CR system exchange an available channel list to avoid mutual interference.

A frequency spectrum is divided into multiple slots in order to manage multiple systems (e.g., a TV broadcast system, the first CR system, the second CR system, and a wireless microphone 110) operating in the same frequency band. The slot will be referred to herein as a channel. One channel is a basic unit that is used when a frequency resource is allocated between the multiple systems. For example, the TV broadcast system is designed to provide a broadcast service within a specific region. Assigned broadcast channels are generally distinguished by dividing an allowed frequency band according to a frequency allocation policy. In a Digital TV (DTV) system, a TV frequency range may include around one hundred TV channels. Each channel has a bandwidth of 6, 7, or 8 MHz. A system using the licensed frequency band as in the case of the TV broadcast system is referred to as an incumbent system or a primary system.

As an example of an incumbent system, the wireless microphone 110 is a narrowband communication apparatus and occupies a part of a TV channel. The first CR system and the second CR system can detect a low power, narrowband apparatus and perform communication by avoiding detected channels.

A CR system coexisting with the incumbent system can detect whether a channel is used by the incumbent system, and if the channel is not used by the incumbent system, the CR system performs communication by using the unused channel. In addition, when a currently used channel is reused by the incumbent system, the CR system can stop the use of the channel and switch to an empty channel, thereby maintaining communication.

A conventional CR system operating in a channel unit performs communication using one channel. In other words, the CR system uses only one channel even if one or more available TV channels are detected by the CR system. The CR system uses various schemes supporting multiple channels such as channel bonding, channel aggregation, and Scalable Orthogonal Frequency Division Multiple Access (SOFDMA) schemes. However, there is no channel management technique to be used in a CR system supporting multiple channels.

Accordingly, there is a need for an apparatus and method for channel management in a Cognitive Radio (CR) system supporting multiple channels.

SUMMARY OF THE INVENTION

An aspect of the present invention is to address at least the above-mentioned problems and/or disadvantages and to provide at least the advantages described below. Accordingly, an aspect of the present invention is to provide a method and apparatus for channel management in a Cognitive Radio (CR) system supporting multiple channels.

In accordance with an aspect of the present invention, a channel management method in a CR system supporting multiple channels is provided. The method includes generating a candidate channel set from an available channel list, configuring a backup channel set by combining at least one candidate channel, and updating the backup channel set when a channel change event occurs.

In accordance with another aspect of the present invention, a channel management apparatus in a CR system supporting multiple channels is provided. The apparatus includes a candidate channel generator for generating a candidate channel set from an available channel list, a backup channel configuration unit for configuring a backup channel set by combining at least one candidate channel, and a channel updating unit for updating the backup channel set when a channel change event occurs.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Hereinafter, an exemplary method and apparatus for spectrum management in a Cognitive Radio (CR) system supporting multiple channels will be described.

Figure 1:
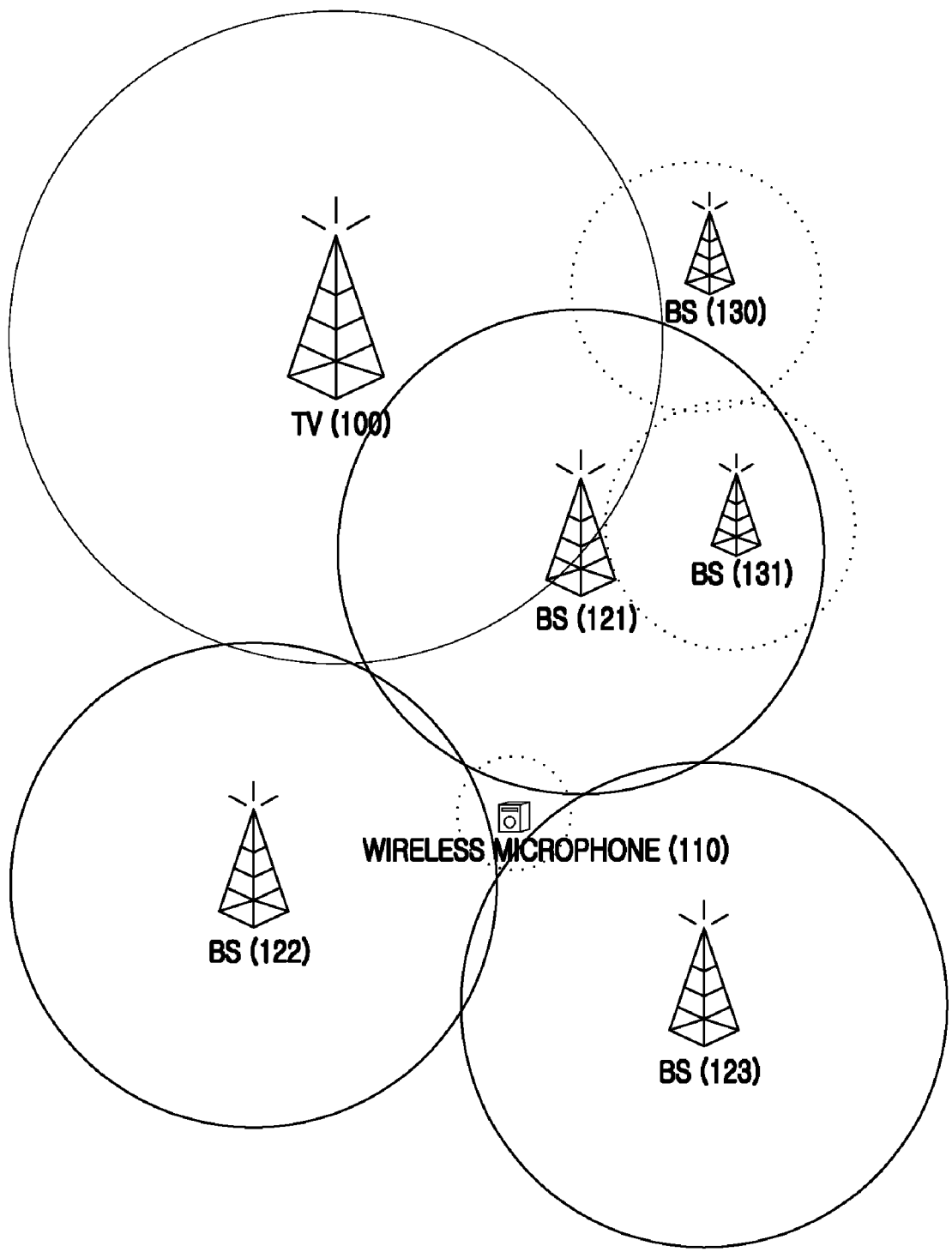
FIG. 1 is a diagram for explaining a concept of a Cognitive Radio (CR) communication system according to the prior art.

It is assumed in the following description that the CR system coexists with one or more incumbent systems in the same area. The CR system finds an empty frequency band by searching for a spectrum of the incumbent systems while not interfering with the incumbent systems. The incumbent systems can access and use a licensed spectrum any time. Herein, the CR system environment described above with reference to FIG. 1 is taken into account. In addition, the frequency band is divided into channels. It is assumed that the channel is a basic unit of frequency band allocation for both the incumbent system and the CR system.

In the following description, a system using an allowed frequency band as in the case of a Tele-Vision (TV) broadcast system is referred to as an incumbent system or a primary system, and a system for searching for a channel band of another system in order to use the found channel band is referred to as a secondary system.

Figure 2:
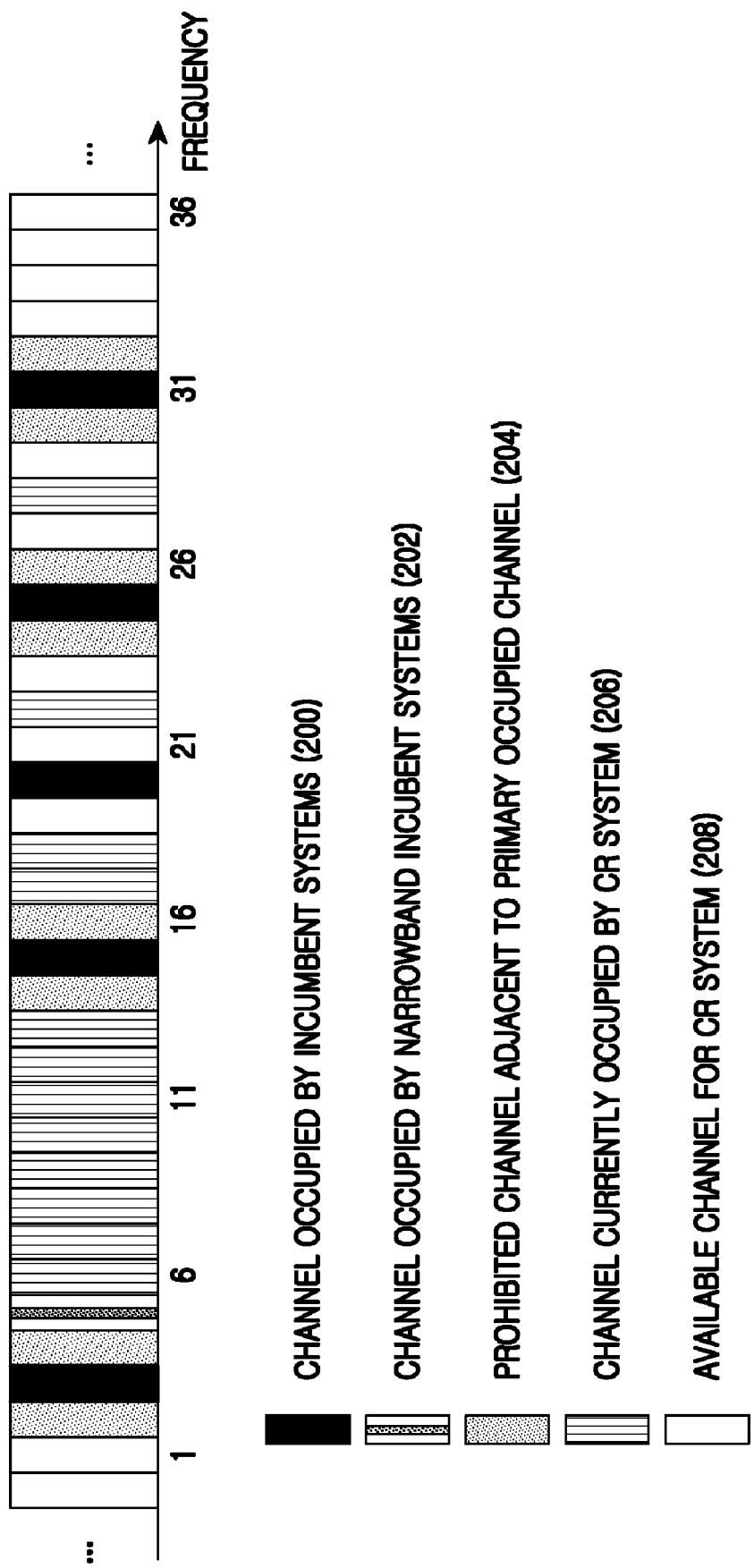
FIG. 2 illustrates a spectrum usage map of a CR system according to an exemplary embodiment of the present invention.

FIG. 2 illustrates a spectrum usage map of a CR system according to an exemplary embodiment of the present invention.

Referring to FIG. 2, the spectrum usage map contains information on a usage state of a disallowed frequency band. That is, a bandwidth that can be used in a primary system and a secondary system is divided into multiple continuous bands. Each divided band is referred to as a channel. All available channels of the primary system and the secondary system are respectively indexed with integers 0, 1, 2, 3, . . . , etc. For example, channel indices 0 to 36 are assigned from left to right in FIG. 2.

A basic function of a secondary system is to determine whether a spectrum is used by other secondary systems. However, a detailed mechanism for performing the basic function of the secondary system is beyond the scope of the present invention. Each of Base Stations (BSs) of the secondary systems can use the spectrum usage map of FIG. 2. In other words, each BS knows whether channels are occupied by the primary system or equivalent systems (e.g., another secondary system).

Each BS searches for available channels for CR communication on the basis of one or more sets of criteria. The criterion may be determined by considering a capability of the BS that performs Orthogonal Frequency Division Multiple Access (OFDMA) communication through multiple channels, a service overhead of the BS, etc.

Referring to FIG. 2, channels 3, 15, 20, 25, and 31 belong to a channel 200 fully occupied by the primary system. Channels 2, 4, 14, 16, 24, 26, 30, and 32 belong to a prohibited channel 204 adjacent to primarily occupied channels (i.e., channels 3, 15, 20, 25, and 31) and prohibited for use in the secondary system to avoid interference according to frequency allocation. The channel 204 may not be considered according to an operator's frequency policy or may be selected in various manners. A channel 5 belongs to a channel 202 partially occupied by a narrowband incumbent system such as a wireless microphone.

The use of the aforementioned channels 200, 202, and 204 is prohibited in an operation of a secondary system. Therefore, the secondary system provides a service through available channels after searching for a spectrum usage map of the primary system.

Examples of channels of the secondary system that can support a multi-channel operation are shown in FIG. 2. That is, among remaining channels except for the channels 200, 202, and 204, a first CR system may use channels 6 to 13 (i.e., 8 channels with a bandwidth of 48 MHz), a second CR system may use channels 17 to 18 (i.e., 2 channels with a bandwidth of 12 MHz), and a third CR system may use discontinuous channels 22 and 28, which are channels belonging to channel 206. If a fourth CR system starts a new service or if the first to third CR systems perform channel switching on a currently used channel, channels 0, 1, 19, 21, 23, 27, 29, 33, 34, 35, and 36, belonging to channel 208, can be used.

An exemplary embodiment of the present invention focuses on a CR system supporting multiple channels. Herein, the CR system performs channel management by classifying channels into an active channel set, a backup channel set, a candidate channel set, an occupied channel set, a disallowed channel set, an unclassified channel set, etc.

Now, an exemplary method of performing channel management by using the aforementioned channel sets will be described with reference to FIG. 3.

Figure 3:
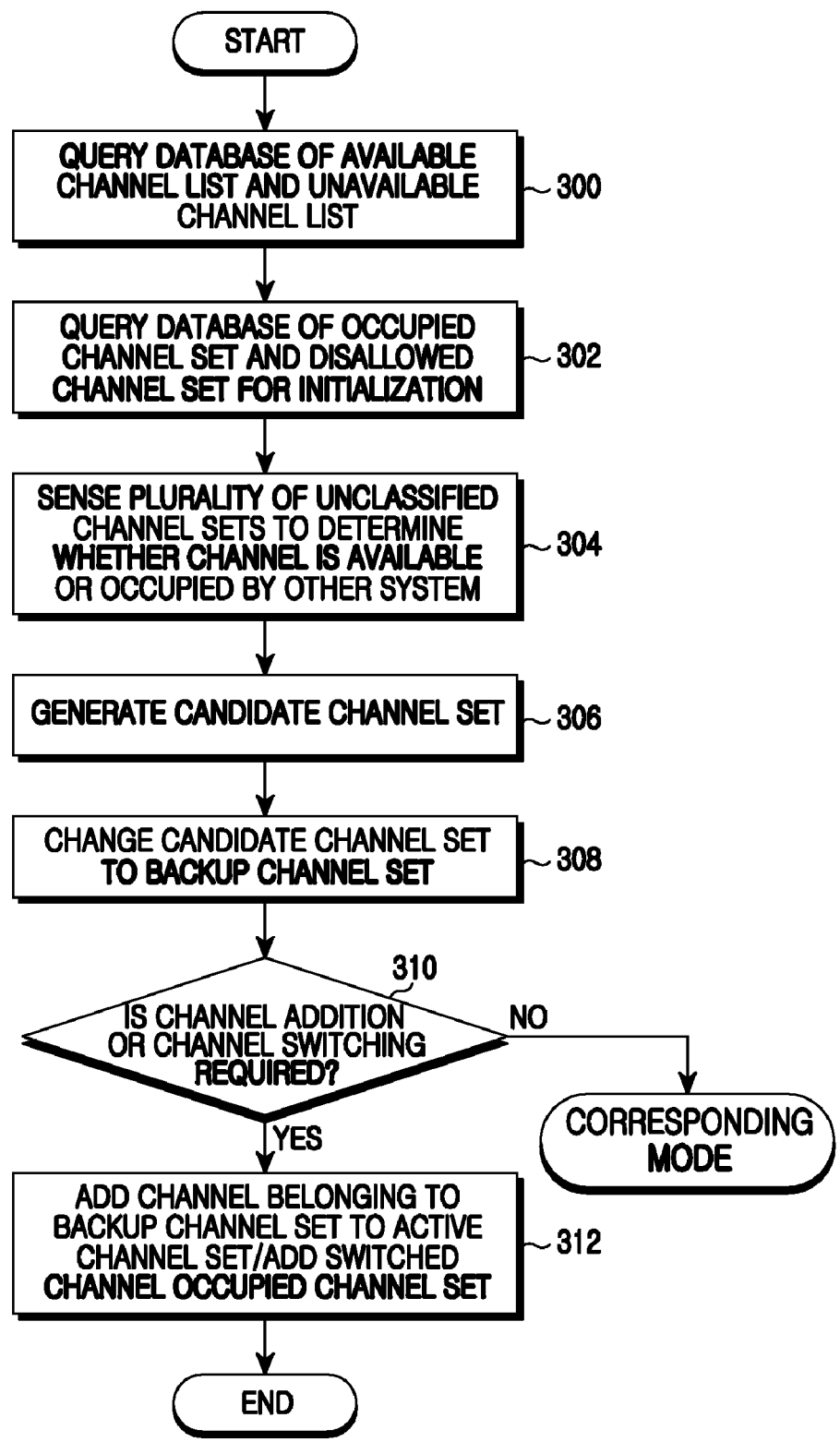
FIG. 3 is a flowchart illustrating a process of channel management in a CR system supporting multiple channels according to an exemplary embodiment of the present invention.

FIG. 3 is a flowchart illustrating a process of channel management in a CR system supporting multiple channels according to an exemplary embodiment of the present invention.

Referring to FIG. 3, a BS queries a database containing an available channel list and an unavailable channel list in step 300. The database stores geo-location information and the available channel list/unavailable channel list, which is provided to the BS or Mobile Stations (MSs) when required. In order to protect a primary system by using the geo-location information of the BS and the MSs, frequency and output power are regulated to minimize interference by determining whether the BS and the MSs are located within or outside of a protection zone of the primary system, and, if the BS and the MSs are located out of the protection zone, by determining how far they are from the protection zone. An unavailable channel denotes a channel that cannot be used permanently. The available channel list may be a single channel list determined by the geo-location information/database. The available channel list may be further divided into an active channel set, a backup channel set, a candidate channel set, an occupied channel set, a disallowed channel set, an unclassified channel set, etc.

In step 302, the BS queries the database of the occupied channel set and the disallowed channel set for initialization. The occupied channel set includes a set of channels used by an incumbent system or other systems. There is no need to frequently perform channel sensing on the occupied channel set. However, prior to configuring of the backup channel set, the channel sensing is performed independently from other channel sets within a given time. The disallowed channel set includes a set of channels prohibited in the CR system. Information on the disallowed channel set is generally contained in the database. The disallowed channel set may be scheduled in a quasi-permanent manner or according to an operator's agreement.

In step 304, the BS performs channel sensing to determine whether channels included in a plurality of unclassified channel sets are available or occupied by other systems. The unclassified channel set includes a channel set on which the channel sensing is not performed yet. The channel sensing may be performed on the unclassified channel set according to a channel state in order to configure the candidate channel set.

In step 306, the BS generates the candidate channel set from the result of step 302 to step 304. That is, the candidate channel set may be configured by removing the occupied channel set and the disallowed channel set from the available channel list and by adding available channels of the plurality of unclassified channel sets to the available channel list. The candidate channel set includes a channel set that can be used in the future and is different from the backup channel set whose channels are seldom subjected to the channel sensing. The channel sensing has to be frequently performed before one channel belonging to the candidate channel set is configured into the backup channel set.

In step 308, the BS configures the candidate channel set into the backup channel set by sorting the candidate channel set. In an exemplary implementation, the backup channel set is determined by sorting the candidate channel set according to a priority. The backup channel set includes a channel set that can be immediately used by the CR system. When the CR system stops the use of a channel currently operating and switches to another channel, the backup channel can be immediately used when required by sorting and storing the candidate channels according to the priority. In the conventional system, the candidate channel is selected and transmitted after frequently performing the channel sensing without performing transmission through a channel of the backup channel set.

As a multi-channel scheme for simultaneously using multiple channels, channel bonding, channel aggregation, and Scalable Orthogonal Frequency Division Multiple Access (SOFDMA) schemes have been described above. There are three cases of configuring the backup channel set according to an exemplary method of configuring the multiple channels.

In a first case, a fixed number of continuous channels are operated. The aforementioned schemes use only continuous multiple channels having a fixed bandwidth (i.e., channel bonding). As an example, the aforementioned channels 0, 1, 19, 21, 23, 27, 29, 33, 34, 35, and 36 of FIG. 2 are available candidate channels. The CR system capable of performing an operation of two continuous channels currently uses channels 17 and 18 of FIG. 2. The CR system can generate the active channel set and the candidate channel set as described below by scanning a spectrum.

The active channel set is {{6~13}, {17~18}, {22, 28}}. The backup channel set is {{0, 1}, {33, 34}, {34, 35}, {35, 36}}. Channels 19, 21, and 23 cannot be immediately used even if they are available candidate channels. This is because two continuous channels cannot be configured since all adjacent channels of channels 19, 21, and 23 are either prohibited or used currently.

If the CR system using channels 17 and 18 detects that the incumbent system uses channels 17 and 18, the CR system has to stop the use of channels 17 and 18 and switch to one of a channel combination (e.g., {0, 1}, {33, 34}, {34, 35}, {35, 36}) having a high priority and included in the backup channel set. For example, when channel interference is used as a criterion for determining the priority, a channel combination {34, 35}, which is farthest in distance from an adjacent channel currently being used, has a highest priority.

In a second case, continuous channels are operated, and selected channels can be flexibly used. That is, a broadband operation can be performed on multiple channels adjacent to a system performing the broadband operation. To avoid interference with the incumbent system or other systems, transmission can be flexibly achieved through one or multiple channels within a band. Such a system may be a Scalable OFDMA system performing an Inverse Fast Fourier Transform (IFFT)/FFT operation. The Scalable OFDMA system can operate one or multiple channels by assigning a null carrier to an unused channel among broadband channels.

In FIG. 2, the created backup channel set may be {{0}, {1}, {19}, {21}, {23}, {27}, {29}, {32}, {33}, {34}, {35}, {36}, {0, 1}, {19, 21}, {21, 23}, {23, 27}, {27, 29}, {29, 33}, {33, 34}, {34, 35}, {35, 36}, {19, 21, 23}, {21, 23, 27}, {23, 27, 29}, {27, 29, 33}, {29, 33, 34}, {33, 34, 35}, {34, 35, 36}, {27, 29, 33, 34}, {29, 33, 34, 35}, {33, 34, 35, 36}, {29, 33, 34, 35, 36}}. For example, among 8 channels (i.e., channels 29 to 36), the null carrier may be assigned to currently used channels 30, 31, and 32 to obtain a channel combination {29, 33, 34, 35, 36}.

The second case of SOFDMA is advantageous over the first case of channel bonding in terms of selective configuration of the backup channel set.

If a priority is determined as a criterion for effectively maximizing a bandwidth in the backup channel set, the channel combination {29, 33, 34, 35, 36} having a maximum bandwidth has a highest priority.

In a third case, discontinuous and non-consecutive channels are operated. If a multi-Radio Frequency (RF) apparatus is supported, the CR system can perform operations of the discontinuous and non-consecutive channels. For example, channel combining is a scheme in which non-consecutive channels are independently operated by selecting multiple RF modules. The channel combining is influenced by the number of selected RF modules.

The backup channel set of FIG. 2 is configured by using two non-consecutive channel combinations from available candidate channels. Thus, the backup channel set is configured with a channel combination of $$C_{11}^2 = \frac{11*10}{2!} = 55.$$

When the priority is determined as a criterion for maximizing channel spacing, a channel combination {0, 36} has a highest priority among 55 channel combinations.

In step 310, the BS determines whether channel addition or channel switching is required. If it is not required, the BS performs a corresponding mode. In an exemplary implementation, the corresponding mode may be repetition of steps 300 to 308. The channel addition operation implies that, when the incumbent system attempts to reuse a certain channel (i.e., an active channel) currently used in the CR system, the CR system stops the use of the channel and switches to another available channel. The channel addition operation implies that a channel is added when a new CR system is used.

If the channel addition or channel switching is required, the BS proceeds to step 312. When the channel addition operation is performed, the BS removes at least one channel combination having a high priority and belonging to the backup channel set from the backup channel set, and adds the channel combination to the active channel set. In addition, when the channel switching operation is performed, the BS removes the at least one channel combination having the high priority and belonging to the backup channel set from the backup channel set, and adds the channel combination to the active channel set. Further, the BS removes a stopped channel included in the active channel set from the active channel set, and adds the stopped channel to the occupied channel set. The active channel set is a channel set used by a current CR system.

Thereafter, the procedure of FIG. 3 ends.

Figure 4:
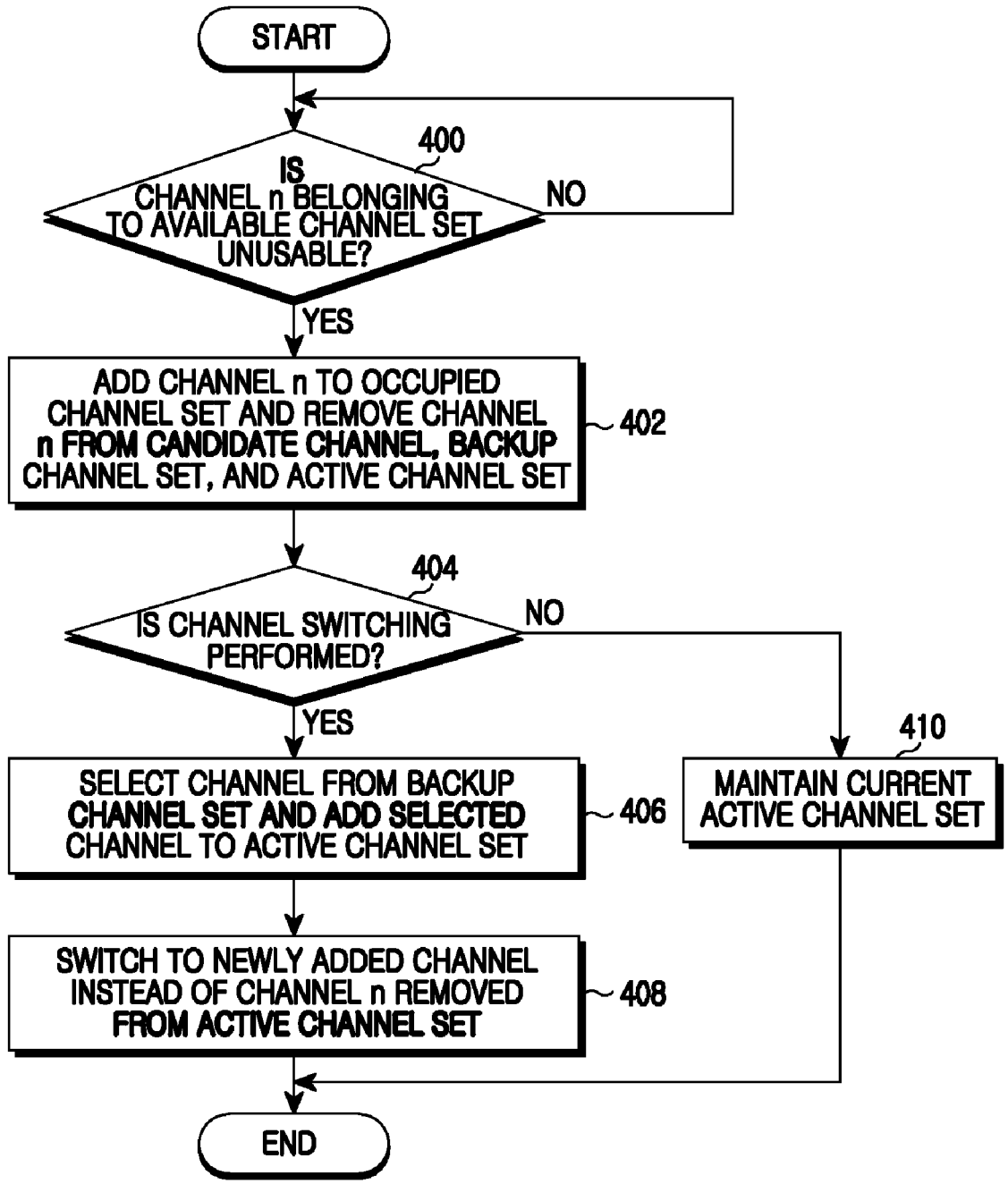
FIG. 4 is a flowchart illustrating a process of updating a channel set in a CR system according to an exemplary embodiment of the present invention.

FIG. 4 is a flowchart illustrating a process of updating a channel set in a CR system according to an exemplary embodiment of the present invention.

Referring to FIG. 4, the BS determines if channel n, belonging to an available channel set, is unusable in step 400. When the BS determines that it cannot use channel n belonging to an available channel set, the BS proceeds to step 402 where it adds channel n to an occupied channel set, and removes channel n from a candidate channel set, a backup channel set, and an active channel set.

In step 404, the BS determines whether channel switching is performed. If the channel switching is performed, the BS proceeds to step 406 where it selects a channel combination having a high priority from the backup channel set, and adds the selected channel combination to the active channels set. In step 408, the BS switches to a newly added channel instead of the channel n removed from the active channel set.

If the channel switching is not performed in step 404, the BS proceeds to step 410 and maintains a current active channel set.

Thereafter, the procedure of FIG. 4 ends.

Figure 5:
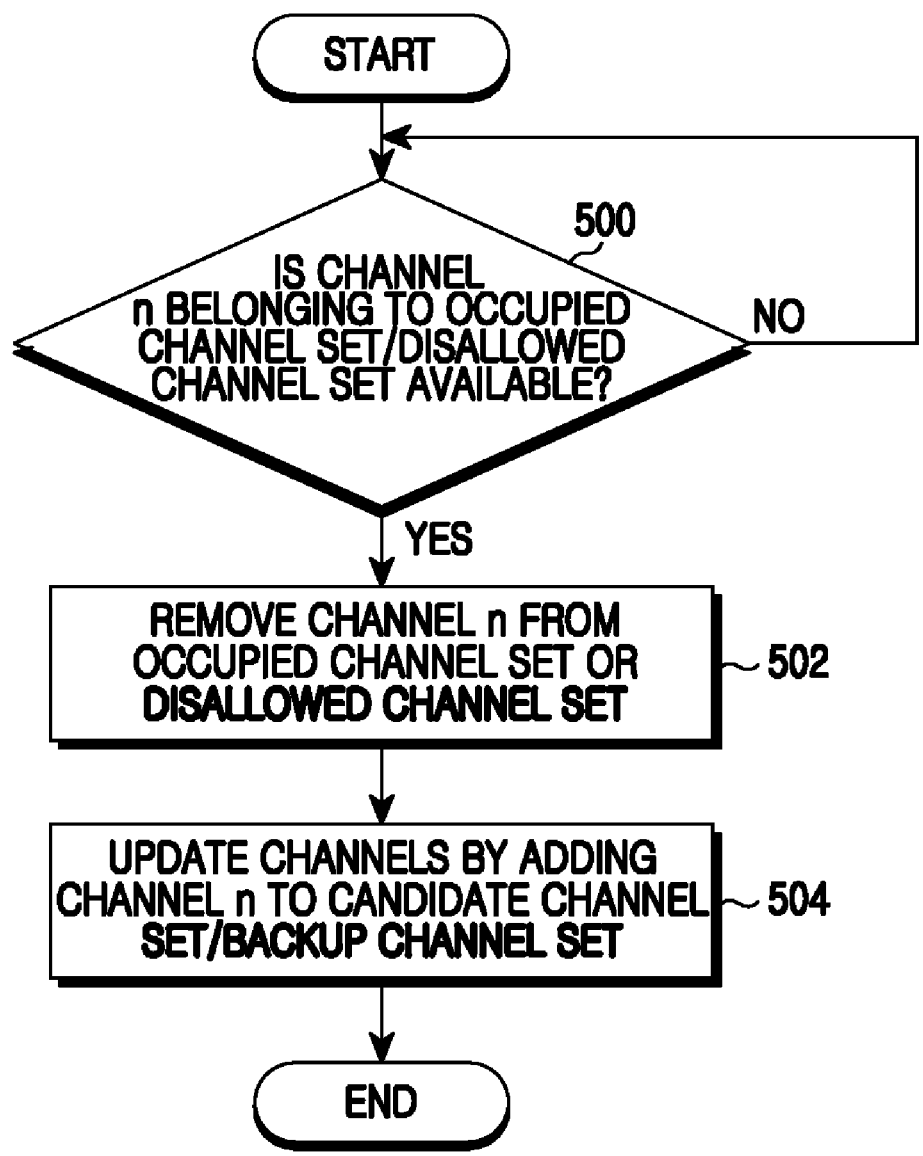
FIG. 5 is a flowchart illustrating a process of updating a channel set in a CR system according to an exemplary embodiment of the present invention.

FIG. 5 is a flowchart illustrating a process of updating a channel set in a CR system according to an exemplary embodiment of the present invention.

Referring to FIG. 5, a BS determines if channel n belongs to an occupied channel set/disallowed channel set in step 500. When the BS can use channel n belonging to an occupied channel set/disallowed channel set, the BS proceeds to step 502 and removes channel n from the occupied channel set or the disallowed channel set.

In step 504, the BS updates channels by adding channel n to a candidate channel set and the backup channel set. Occasionally, channel n may not be included in the backup channel set.

Thereafter, the procedure of FIG. 5 ends.

Figure 6:
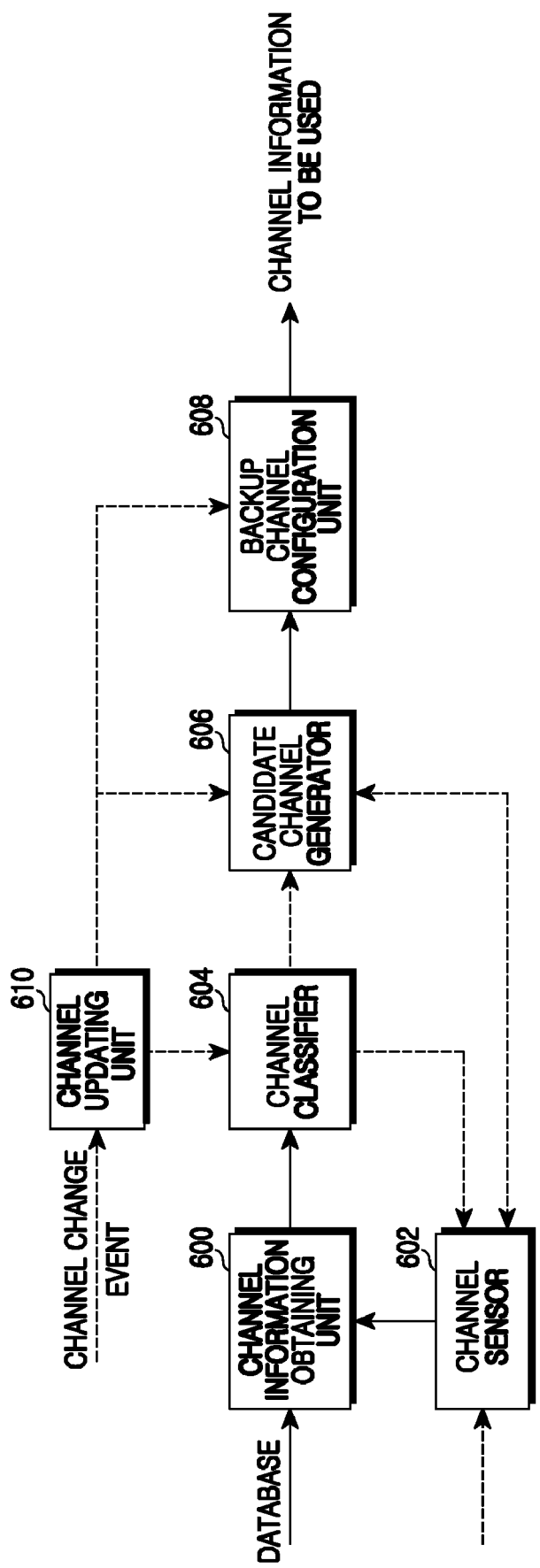
FIG. 6 is a block diagram illustrating an apparatus for channel management in a CR system supporting multiple channels according to an exemplary embodiment of the present invention.

FIG. 6 is a block diagram illustrating an apparatus for channel management in a CR system supporting multiple channels according to an exemplary embodiment of the present invention.

Referring to FIG. 6, a BS includes a channel information obtaining unit 600, a channel sensor 602, a channel classifier 604, a candidate channel generator 606, a backup channel configuration unit 608, and a channel updating unit 610. The block diagram illustrates functional blocks for channel management, and discussion and representation of other functional blocks for performing general functions of the BS are omitted for conciseness.

The channel information obtaining unit 600 queries a database of an available channel list and an unavailable channel list. Further, the channel information obtaining unit 600 queries the database of an occupied channel set and a disallowed channel set for initialization and provides the query result to the channel classifier 604.

The channel sensor 602 performs channel sensing to determine whether channels included in a plurality of unclassified channel sets are available or occupied by other systems and provides the channel sensing result to the channel information obtaining unit 600. The unclassified channel set includes a channel set on which the channel sensing is not performed yet. The channel sensing may be performed on the unclassified channel set according to a channel state in order to configure a candidate channel set.

The channel classifier 604 receives from the channel information obtaining unit 600 the available channel list, information on the occupied channel set and the disallowed channel set, and available channel information included in the plurality of unclassified channel sets, and then classifies channel sets. Thereafter, the channel classifier 604 outputs the classification result to the candidate channel generator 606. Further, the channel classifier 604 requests the channel sensor 602 to perform the channel sensing on the unclassified channel set. The channel sensor 602 performs the channel sensing on channels of the unclassified channel set and the candidate channel set.

The candidate channel generator 606 generates the candidate channel set by using the result obtained from the channel classifier 604 and outputs the generated candidate channel set to the backup channel configuration unit 608. That is, the candidate channel set may be configured by removing the occupied channel set and the disallowed channel set from the available channel list and by adding available channels of the plurality of unclassified channel sets to the available channel list.

The backup channel configuration unit 608 configures the candidate channel set into a backup channel set by sorting the candidate channel set according to a priority. The backup channel set includes a channel set that can be immediately used by the CR system. When the CR system stops the use of a channel currently operating and switches to another channel, the backup channel can be immediately used when required by sorting and storing the candidate channels according to the priority. In the conventional system, the candidate channel may be selected and transmitted after frequently performing the channel sensing without performing transmission through a channel of the backup channel set.

If channel n belonging to the candidate channel set cannot be used according to a channel change event, the channel updating unit 610 removes channel n from the candidate channel set, the backup channel set, and the active channel set, selects at least one of channel combinations from the backup channel set according to the priority, and adds the selected channel combination to the active channel set. If channel n belonging to the occupied/disallowed channel set can be used, the channel updating unit 610 removes channel n from the occupied channel set or the disallowed channel set, and updates the candidate channel set and the backup channel set by adding channel n to the candidate channel set and the backup channel set.

According to exemplary embodiments of the present invention, spectrum management may be achieved after classifying a plurality of channel sets by considering a multi-channel operation characteristic in a CR system. Therefore, multiple channels can be used in CR communication. In addition, the multiple channels can be managed by considering a channel sensing scheme, a data query scheme, a spectrum policy, etc.

While the present invention has been shown and described with reference to certain exemplary embodiments thereof, it will be understood by those skilled in the art that various changes in form and details may be made therein without departing from the spirit and scope of the present invention as defined by the appended claims and their equivalents. Therefore, the scope of the invention is defined not by the detailed description of the invention but by the appended claims and their equivalents, and all differences within the scope will be construed as being included in the present invention.

What is claimed is:

1. A channel management method in a Cognitive Radio (CR) system supporting multiple channels, the method comprising:
    generating a candidate channel set from an available channel list;
    configuring a backup channel set by combining at least one candidate channel;
    determining a priority for each element of the backup channel, according to a criterion for at least one of maximum frequency efficiency, minimum channel interference and maximum channel spacing;
    sorting channel combinations of the backup channel set according to the priority; and
    updating the backup channel set when a channel change event occurs,
    wherein the backup channel set is configured by a multi-channel scheme comprising a channel bonding scheme, a Scalable Orthogonal Frequency Division Multiple Access (OFDMA) scheme, or a channel aggregation scheme that supports the multiple channels.

2. The method of claim 1, wherein the generating of the candidate channel set comprises:
    querying a database of an available/unavailable channel list; and
    removing an occupied channel set and a disallowed channel set from the available channel list and adding a corresponding available channel by sensing channels of a plurality of unclassified channel sets.

3. The method of claim 1, wherein, when the channel bonding scheme is used as the multi-channel scheme, at least one continuous channel combination is configured from the candidate channel set.

4. The method of claim 1, wherein, when the Scalable Orthogonal Frequency Division Multiple Access (OFDMA) scheme is used as the multi-channel scheme,
    if the candidate channel set is $\{A_k^1\}, \{A_k^1, B_k^2\}, \ldots \{A_k^1, B_k^2, \ldots, X_k^m\}$, the backup channel set comprises $\{A_k^1\}, \{A_k^1, B_k^2\}, \ldots \{A_k^1, B_k^2, \ldots, X_k^m\}$ according to a broadband Inverse Fast Fourier Transform (IFFT)/FFT size,
    wherein k denotes an integer from 1 to m, m denotes the maximum available channel number,
    wherein a element of the backup channel $(A_k^1, B_k^2, \ldots, X_k^m)$ is a continuous channel or is not a continuous channel each other.

5. The method of claim 1, wherein, when the channel aggregation scheme is used as the multi-channel scheme,
    if the candidate channel set is $\{A_k^1\}, \{A_k^1, B_k^2\}, \ldots \{A_k^1, B_k^2, \ldots, X_k^m\}$, the backup channel set comprises $\{A_k^1, B_k^2, \ldots, X_k^n\}$,
    wherein k denotes an integer from 1 to m, m denotes the maximum available channel number, and n denotes the operating channel number,
    wherein a element of the backup channel $(A_k^1, B_k^2, \ldots, X_k^m)$ is a continuous channel or is not a continuous channel each other.

6. The method of claim 1, wherein the channel is defined as certain section of a frequency bandwidth.

7. The method of claim 1, further comprising:
    if channel n belonging to the candidate channel set is unavailable, removing channel n from at least one of a candidate channel set, the backup channel set, and an active channel set;
    selecting at least one channel combination from the backup channel set according to a priority;
    adding the selected channel combination to the active channel set; and
    switching to a newly added channel instead of channel n removed from the active channel set,
    wherein n denotes an integer.

8. The method of claim 1, further comprising:
    if channel n belonging to one of an occupied channel set and a disallowed channel set is available, removing channel n from the one of the occupied channel set and the disallowed channel set; and
    updating channels by adding channel n to the candidate channel set and the backup channel set,
    wherein n denotes an integer.

9. The method of claim 1, wherein the CR system coexists with at least one incumbent system using the same spectrum as the CR system.

10. A channel management apparatus in a Cognitive Radio (CR) system supporting multiple channels, the apparatus comprising:
    a candidate channel generator for generating a candidate channel set from an available channel list;

a backup channel configuration unit for configuring a backup channel set by combining at least one candidate channel; and a channel updating unit for updating the backup channel set when a channel change event occurs;

wherein the backup channel set is configured by a multi-channel scheme comprising a channel bonding scheme, a Scalable Orthogonal Frequency Division Multiple Access (OFDMA) scheme, or a channel aggregation scheme that supports the multiple channels, and wherein channel combinations of the backup channel set are sorted according to a priority, and the priority for each element of the backup channel is determined according to a criterion for at least one of maximum frequency efficiency, minimum channel interference, and maximum channel spacing.

11. The apparatus of claim 10, further comprising:
a channel information obtaining unit for querying a database of an available/unavailable channel list before the candidate channel set is generated; and
a channel classifier for removing an occupied channel set and a disallowed channel set from the available channel list and for adding a corresponding available channel by sensing channels of a plurality of unclassified channel sets.

12. The apparatus of claim 11, wherein, if channel n belonging to the candidate channel set is unavailable, the channel updating unit removes channel n from at least one of the candidate channel set, the backup channel set, and an active channel set, selects at least one channel combination from the backup channel set according to a priority, and adds the selected channel combination to the active channel set, and wherein n denotes an integer.

13. The apparatus of claim 10, wherein, when the channel bonding scheme is used as the multi-channel scheme, at least one continuous channel combination is configured from the candidate channel set.

14. The apparatus of claim 13, wherein, if channel n belonging to the occupied/disallowed channel set is available, the channel updating unit removes channel n from the occupied channel set or the disallowed channel set and updates channels by adding channel n to the candidate channel set and the backup channel set, and wherein n denotes an integer.

15. The apparatus of claim 10, wherein, when the Scalable Orthogonal Frequency Division Multiple Access (OFDMA) scheme is used as the multi-channel scheme, if the candidate channel set is $\{A_k^1\}, \{A_k^1, B_k^2\}, \ldots \{A_k^1, B_k^2, \ldots, X_k^m\}$, the backup channel set comprises $\{A_k^1\}, \{A_k^1, B_k^2\}, \ldots \{A_k^1, B_k^2, \ldots, X_k^m\}$ according to a broadband Inverse Fast Fourier Transform (IFFT)/FFT size, wherein k denotes an integer from 1 to m, m denotes the maximum available channel number, wherein a element of the backup channel $(A_k^1, B_k^2, \ldots, X_k^m)$ is a continuous channel or is not a continuous channel each other.

16. The apparatus of claim 10, wherein, when a channel aggregation scheme is used as the multi-channel scheme, if the candidate channel set is $\{A_k^1\}, \{A_k^1, B_k^2\}, \ldots \{A_k^1, B_k^2, \ldots, X_k^m\}$, the backup channel set comprises $\{A_k^1, B_k^2, \ldots, X_k^n\}$, wherein k denotes an integer from 1 to m, m denotes the maximum available channel number, and n denotes the operating channel number, wherein a element of the backup channel $(A_k^1, B_k^2, \ldots, X_k^m)$ is a continuous channel or is not a continuous channel each other.

17. The apparatus of claim 10, wherein the channel is defined as certain section of a frequency bandwidth.

18. The apparatus of claim 10, wherein the CR system coexists with at least one incumbent system using the same spectrum as the CR system.

* * * * *